(No Model.) 6 Sheets—Sheet 1.
F. R. GOOLMAN.
AUTOPNEUMATIC PIANO PLAYER.

No. 598,419. Patented Feb. 1, 1898.

WITNESSES:
Jos. A. Ryan
Edw. T. Byrn

INVENTOR
F. R. Goolman
BY Munn & Co.
ATTORNEYS.

(No Model.)

F. R. GOOLMAN.
AUTOPNEUMATIC PIANO PLAYER.

No. 598,419.                                     Patented Feb. 1, 1898.

WITNESSES:
Jos. A. Ryan
Edw. W. Byrn

INVENTOR
F. R. Goolman.
BY Munn & Co.
ATTORNEYS.

(No Model.)  F. R. GOOLMAN.  6 Sheets—Sheet 6.
AUTOPNEUMATIC PIANO PLAYER.

No. 598,419.  Patented Feb. 1, 1898.

Fig. 79.

WITNESSES:
Jos. A. Ryan
Edw. W. Byrn

INVENTOR
F. R. Goolman.
BY Munn & Co,
ATTORNEYS.

UNITED STATES PATENT OFFICE.

FRED R. GOOLMAN, OF LOS ANGELES, CALIFORNIA, ASSIGNOR OF THREE-FOURTHS TO JOHN WEBER AND JOHN N. GOOLMAN, OF SAME PLACE.

AUTOPNEUMATIC PIANO-PLAYER.

SPECIFICATION forming part of Letters Patent No. 598,419, dated February 1, 1898.

Application filed September 15, 1896. Serial No. 605,944. (No model.)

*To all whom it may concern:*

Be it known that I, FRED R. GOOLMAN, of Los Angeles, in the county of Los Angeles and State of California, have invented a new and Improved Autopneumatic Piano-Player, of which the following is a full, clear, and exact description.

My invention relates to pneumatic piano-players in which pneumatic action in combination with bellows, valves, and tubes form the principal parts of the mechanism.

The objects of my invention are, first, to provide an automatic piano-player which operates with a much more perfect action and a finer and more delicate expression; secondly, to control the entire music and operate the expression-pedals and rewind the music on the music-roll after it has been played without the assistance of the operator. I attain these objects by a mechanism illustrated in the accompanying drawings, in which—

Horizontal action-rails B B and C C (see Figs. 1 and 2) form the supports to which the vertical striking-bellows D and the vertical valve-board E are attached and form the framework of the action, which is arranged vertically and is beneath the piano-keys.

Horizontal flange-rails F F above support the flanges $ff$ and pivoted bell-crank pieces G G. E is the valve-board, fastened to framework C B and arranged vertically. To the outer face of the valve-board E is attached the case-board H, milled out so as to form a vacuum-chamber I. Said case-board H is provided with holes under the horizontal tube-board J, to which the tubes K are attached. On the inside of case-board H are placed lifter-bellows $h$ of peculiar construction, which will be more fully described hereinafter.

Figures 3, 4:
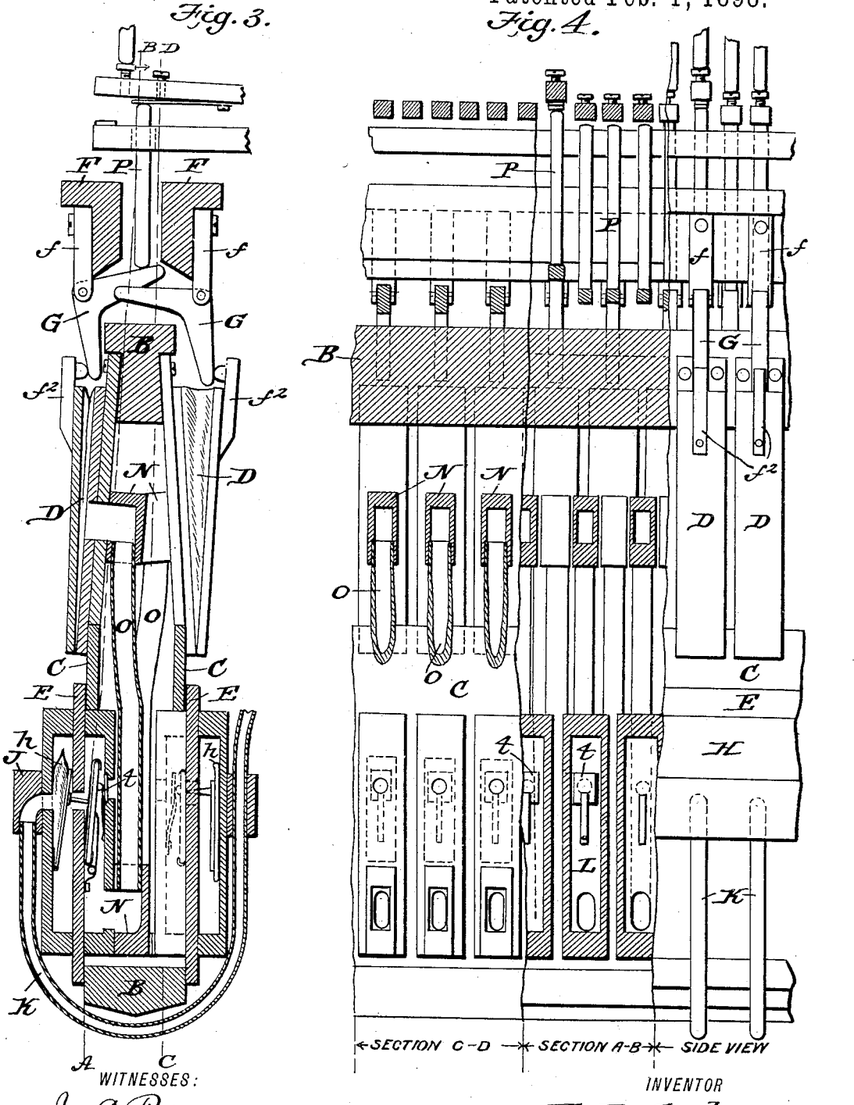
Fig. 3 is a sectional end view showing a striking-bellows closed and a lifting-stem raising a key.
Fig. 4 is a side view with parts cut away in section on lines A B and C D of Fig. 3, showing the cells, air-tubes, and elbow-couplings. Section A B of Fig. 4 shows the cells cut open and the lifting-stem resting on the ends of the bell-crank pieces and under the ends of the piano-keys. Section C D of Fig. 4 shows the back of the cells with elbow-couplings and air-tubes cut open.
Figure 11:
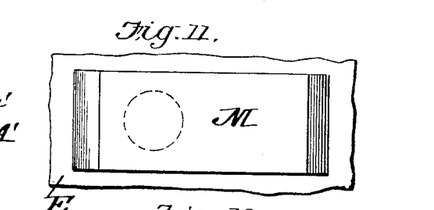
Fig. 11 is a top view of the check-valve used in this instrument.
Figure 12:
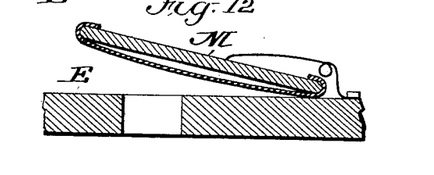
Fig. 12 is a section of said valve.

On the back of the valve-board E are placed small valve-cells L, as shown in sections in Fig. 4. Said cells L are each provided with vent-valve $t$. On the inside of each cell L and resting on the valve-board E are check-valves M, covering a hole in said board. These valves M are of special form (see Figs. 11 and 12) and made as follows: To a thin board of suitable size is attached a strip of soft leather of equal width in the following manner: The leather strip is enough longer than the board to admit of the ends passing around each end of the board and be glued fast on top only, leaving the entire length under the board free and sagging, making a perfect check-valve, which is held in place on valve-board E by means of a spring, as shown. To the outside of said valve-cells L (see Fig. 1) are attached elbow-couplings N for connecting with central air-tubes O, leading to corresponding couplings N' on the striking-bellows D. Said striking-bellows D are provided with fingers $f^2$, covered with action-leather for striking the bell-cranks G.

Figures 1, 2:
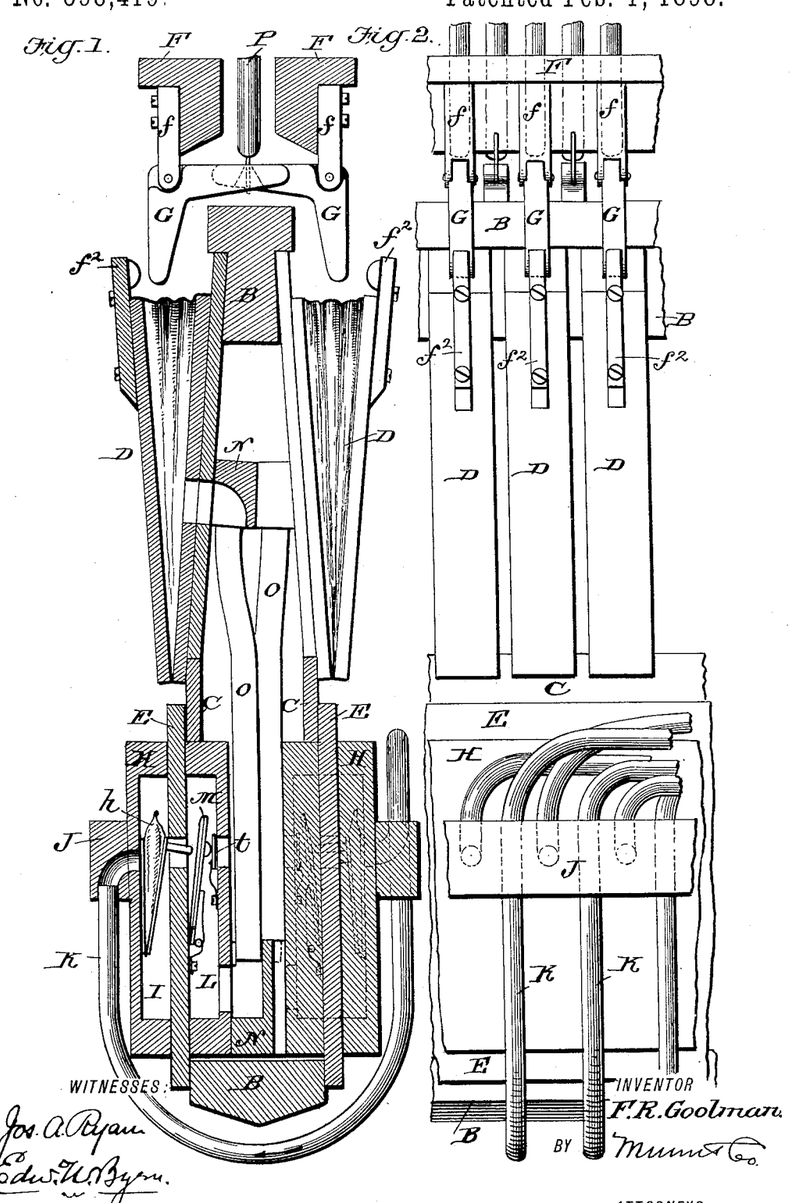
Figure 1 is a vertical cross-section of the action, showing the small bellows, valves, air-tubes, and framework.
Fig. 2 is a front view of a part of the action.

In Fig. 2 is shown a portion of the front of the action, the back and front being just alike, forming a double row of bellows, bell-cranks, &c. The reason for this double row is on account of the number of parts, there not being sufficient room to admit of their all being in one continuous row and bring each striker under a key, so they are arranged in double row, so as to bring a striking-bellows and a bell-crank under each key of the piano.

Figure 13:
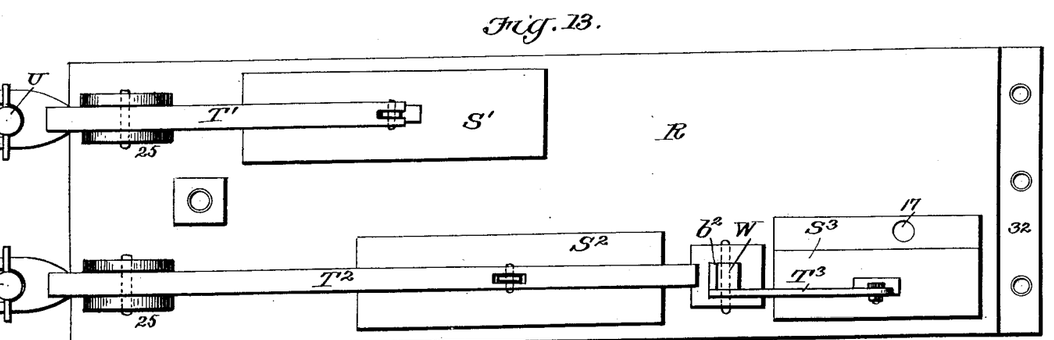
Fig. 13 is a top view of pedal-action.
Figure 14:
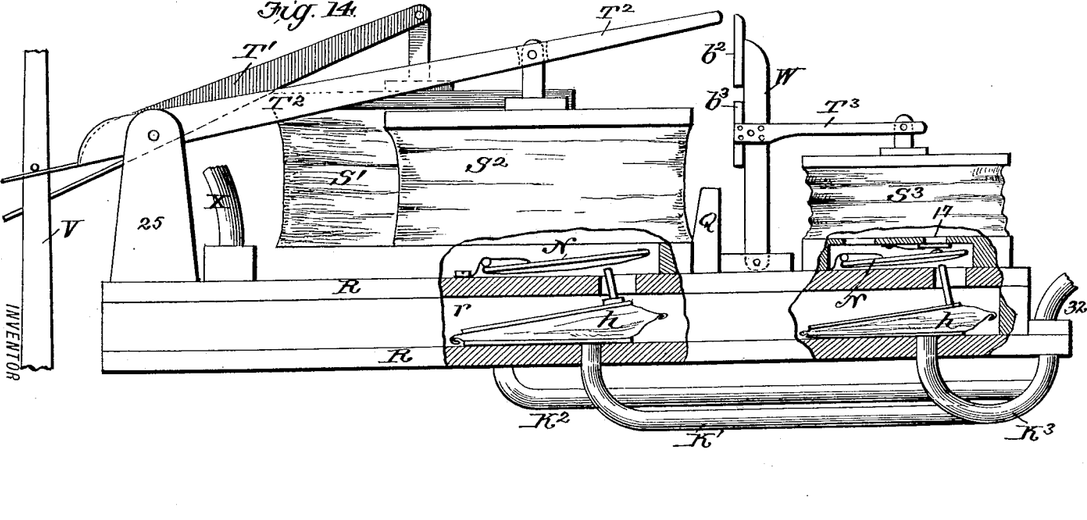
Fig. 14 is a side view of said pedal-action with portions broken away, showing valve-action.

In Figs. 13 and 14 is shown the action which operates the pedals of the piano. There is a vacuum-chamber $r$, formed by the top and bottom boards R R and a suitable marginal strip to keep them the proper distance apart. On the top board is mounted three bellows S', S², and S³. Bellows S' operates lever T', which in turn operates damper-rod U. Bellows S² operates lever T², which controls expression-rod V. Bellows S³ operates lever T³, which is attached to a catch or tripping-bar W, which is pivoted at its lower end and provided with two catch-blocks $b^2\ b^3$ on its face for catching the end of lever T² when it is drawn down, as described hereinafter. On the inside of vacuum-chamber $r$ are placed lifting-bellows $h$ similar to those in the action before described.

Figures 5, 6:
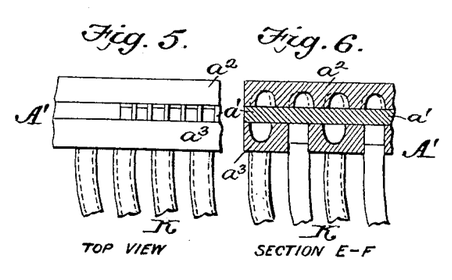
Fig. 5 is a top view of a portion of the air-duct bridge over which the perforated paper strip passes.
Fig. 6 is a section of the same on line E F of Figs. 7 to 10.
Figure 7:
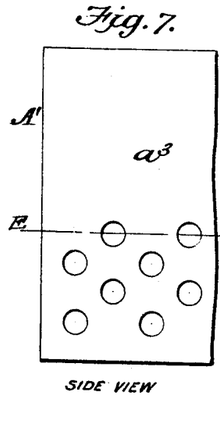
Fig. 7 is a side view of a portion of the air-duct bridge, showing holes where air-tubes are attached.
Figure 8:
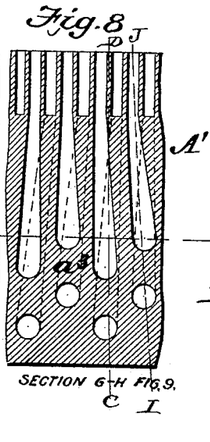
Fig. 8 is a section on line G H of Fig. 9.
Figures 9, 10:
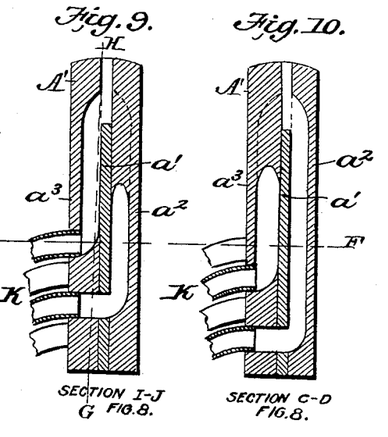
Fig. 9 is a section on line I J of Fig. 8.
Fig. 10 is a section on line C D of Fig. 8.

Under each of the bellows $s'$, $s^2$, and $s^3$ and inside of each bellows and resting on top board is placed a check-valve N, and to each of said lifting-bellows is attached an air-tube K' K² K³, as shown in Fig. 14. The vacuum-chamber is provided with an air-tube X, extending from top board of same to an air-trunk, hereinafter more fully described. All the air-tubes K in the striking and in the pedal action lead to the side of air-duct bridge, which is provided with holes to receive them, as shown in Fig. 7. Each of these holes communicates with corresponding small openings on the top (or edge) of the air-duct bridge, as shown in Figs. 5 and 8. Figs. 5, 6, 7, 8, 9, and 10 show the manner in which this air-duct bridge is constructed. It is composed of three pieces of wood or other suitable material, and the central section $a'$ is thinner than the two outer sections and has its upper edge cut in such a manner as to form teeth not unlike a comb, so that when the two outer sections $a^2\ a^3$ are glued onto it the spaces between the teeth form small ducts, as shown in Fig. 5. These ducts extend downward about one-fourth of the total width of the block, as shown in Fig. 8. The two outer sections are much thicker than the center section and are grooved on their inner surface in such a manner as to connect with each of the spaces between the teeth of the center piece, and said grooves are so arranged and of various lengths so as to connect with holes for attaching the air-tubes. This arrangement of ducts and grooves admits the attachment of all the tubes to one side, as shown in Figs. 9 and 10, which is important in assembling and attaching air-tubes.

Figure 15:
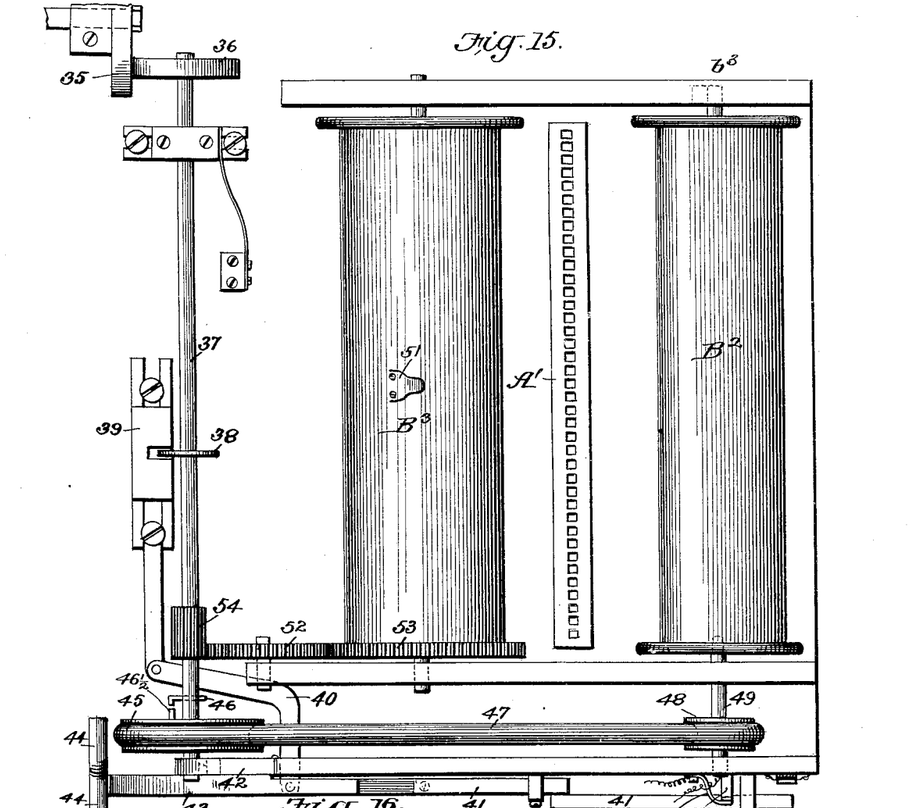
Fig. 15 is a plan view of music-drawer, showing music-rolls, metronome, air-duct bridge, and rerolling device.

The music for this instrument is composed of long strips of paper, the exact width corresponding to the length of the music-rolls B², Fig. 15, and the music is written by punching holes in this paper, so arranged that when passing over the air-duct bridge A' the holes will pass the openings in the said bridge and allow air to enter the same in the well-known manner.

Figure 16:
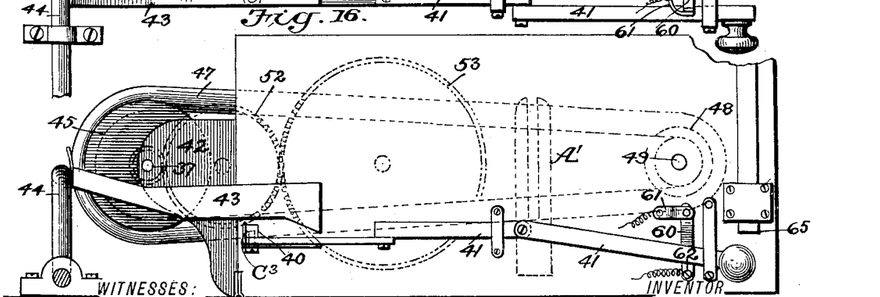
Fig. 16 is an end view of said music-drawer.

The music-drawer, as shown in Figs. 15 and 16, contains the music-roll B², feed-drum B³, gear-wheels 52, 53, and 54, rewinding-pulleys 45 and 48, belt 47, and the metronome, which regulates the speed and operates the rerolling device. This metronome is composed of the following parts: a shaft 37, collar 38, shifting block 39, bell-crank 40, and jointed arm 41. On the shaft 37 is mounted a friction-wheel 36, which receives motion from the driving-wheel 35, giving motion to pinion 54, which transmits the motion to the feed-drum B³ by means of the gears 52 and 53. On the shaft 37 is loosely mounted pulley 45, which drives the reroll-pulley 48 at the proper time, as hereinafter described. The end of the shaft 37 on which pulley 45 and pinion 54 are placed is provided with a movable bearing 42, on which is arm 43. The jointed arm 41 of the metronome is provided with a knob and suitable guides, through which it passes. Near the outer end and under said arm is situated a brass spring 60, screwed to the end board, as shown at 62. This spring is so bent that it presses out against the arm, so that when the knob is pressed downward, as shown in Fig. 16, the top end of the spring springs out and into contact with a brass strip, as shown at 61. The object of this spring is to open and close the electric circuit when an electric motor is used to run the instrument. When the handle is down, the contact is made and the motor starts, and by raising the arm the spring is pressed back and the circuit broken and motor stops.

The instrument is to be driven by any suitable motive power, such as electric motor, water-motor, spring or weight motor, whichever is most convenient to the owner of the piano or other instruments in which it is to be placed. The action is intended to be made to fit almost any piano or reed instrument, the shape of parts being modified to suit.

When the motor is placed in the instrument, it is so arranged that it gives motion to a shaft at the back of the instrument. This shaft operates the triple exhaust pumps or bellows, which are made and so arranged as to fit in between the timbers at the back of the instrument. These pumps or bellows are connected to a main bellows which is kept expanded by a strong spring. The main bellows is connected to the vacuum-chambers described by an air-trunk of suitable shape and capacity. Therefore when the motor is started the pumps exhaust the air from the main bellows, causing it to collapse, also exhausting the air from the vacuum-chambers. The spring in the main bellows keeps a constant and equal pressure, so that when air is admitted to the chambers through the tubes the bellows expands and keeps the suction the same, thereby equalizing the irregularity of the pumps and air admitted.

Figure 19:
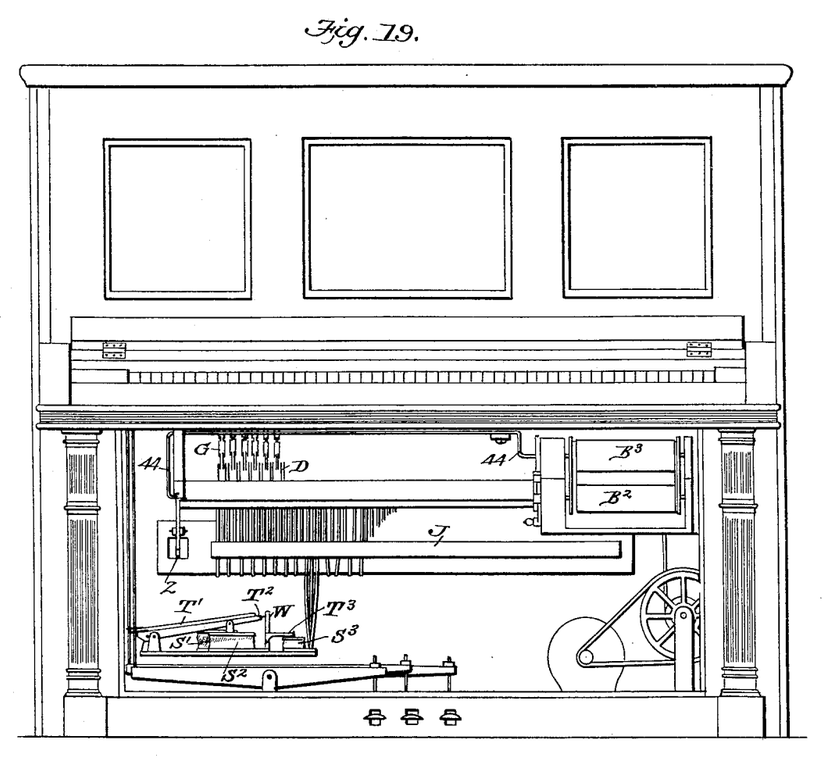
Fig. 19 is a front elevation of a piano, showing the general arrangement and relation of parts in the instrument, the front panel being removed to show pneumatic parts, relief-valve $z$, pedal-action, and music-drawer.

The pneumatic action is placed in the front of the piano under the keyboard and close to the strings, so that the front panels may be placed back in position, hiding the entire action with the exception of the music-drawer, Figs. 15 and 16. This music-drawer is hung under the keyboard at the right-hand side out of the way of a person sitting at the instrument, as shown in Fig. 19, and there is nothing to interfere with playing the instrument in the ordinary way.

Having described the working parts, I will now explain the operation of the instrument.

To explain the action of the instrument, the sheet-music, which is always on a roll $B^2$, is placed in the music-drawer, as follows: First lower the drawer, which is hinged at the back. Then place the end of the roll, which is provided with a flat or square hole, on the end of the small reroll-shaft 49. Then drop the other end of the roll, which is provided with a pivot, into a recess in the drawer-frame at $b^3$, Fig. 15. Then take the loose end of the music-sheet, which is provided with a small brass ring, and pass it back and hook the ring into the hook 51 on the feed-drum. Give the drum a slight turn to take up the slack paper, and then raise the drawer up until it catches and is held by spring-hook 65, Fig. 16. Start the motor by pressing down the knob on the jointed arm 41, which will release spring 60, which latter comes in contact with the plate 61 and completes the electric circuit. The motor starts at once, the sheet-music begins to move over the air-duct bridge, and the pumps also being in motion the air is exhausted from the vacuum-chambers and draws the sheet-music paper down onto the air-duct bridge, preventing the air from entering the openings in the bridge, and there being no other way for air to reach the vacuum-chamber as the perforations in the music reach the openings in the bridge the instrument begins to play. The valves, strikes, and keys are operated as follows: As the paper moves, the first perforation in it to uncover the opening in the bridge allows the air to rush in said opening and through the air-tube K to the lifter-bellows $h$, Fig. 1, in the vacuum-chamber I. This little bellows instantly opens, and by means of a pin on its side lifts the check-valve M in the cell L on the valve-board. This action allows the air to be instantly drawn out of the striking-bellows D through the tube O, causing the latter to collapse, and the finger $f^2$ of bellows D strikes one end of a bell-crank G, which throws the other end of said crank up. A wooden stem P rests on the end of elbow-lever G and reaches up and comes in contact with the bottom of the key immediately above it, causing the hammer belonging to that key to strike the strings. As soon as the paper moves forward enough to allow the perforation to pass the opening in the air-duct bridge the paper closes it again, shutting off the air. The suction in the vacuum-chamber causes the check-valve M to close, forcing the air out of the lifter-bellows $h$ through a small vent, (shown at $a$, Fig. 17,) also allowing the small valve $t$ in the cell L to open, letting air into the cell and back up through tube O to striking-bellows D, allowing it to open instantly. This operation is the same in all the keys.

The object of the metronome is to regulate the speed, stop and start the motor, and operate the rerolling device, all of which is done with the one handle or knob on arm 41 in the following manner: Push down the handle to start, raise it up to stop. If the music is not playing fast enough, pull out on the handle a little, which moves the outer end of bell-crank 40, the inner end of which is attached to shifting block 39, which when moved to the left (or downwardly in Fig. 15) draws the shaft 37 with it by means of collar 38. The shaft moving to the left draws the friction-wheel 36 farther out from the center of the driving-wheel 35, thereby increasing the speed of the metronome-shaft, making the feed-drum revolve faster. The more rapidly the sheet-music passes over the air-duct bridge the faster the music will be played. To play slower, the action is reversed—namely, by pushing in the handle. When the music has run off of the music-roll onto the feed-drum, the instrument is not stopped in order to rewind music; but it is only necessary to pull the metronome-handle out to the full limit. It moves the shaft 37 so far to the left that the small pin 46 will engage the pin $46\tfrac{1}{2}$ on the pulley 45, causing it to revolve with the shaft driving the belt 47, which drives the reroll-pulley 48. However, before the shaft 37 moves far enough to the left for the pins 46 $46\tfrac{1}{2}$ to engage the outer end of the bell-crank 40 passes under a lug on arm 43, which is attached to movable bearing 42, as shown at $C^3$, Fig. 16, causing the movable bearing to be tipped back about the point $h^2$, so as to throw the pinion 54 out of gear with wheel 52 and release the feed-drum, allowing it to revolve backward while the paper is being rewound on music-roll. When it is all off the feed-drum, the ring on music-sheet unhooks automatically. There is still another action which takes place while this rerolling action is going on. When the movable bearing tips back, (to disengage the gear,) it comes into contact with a crank 44, Fig. 15, on a small rod, pushing it back. This rod operates a valve $z$, Fig. 19, on the vacuum-chamber, opening it to admit air, for as the motor is still going and the pumps working it is necessary to admit air to the vacuum-chamber to relieve it while rerolling in order to prevent pneumatics working by the return of the sheet over the air-duct bridge, which would play the music backward with a jumble of discordant sounds. When the rerolling is completed, the handle is pushed back and raised, the motor then stops, and the removable bearing returns to its normal position, allowing vent-valve to close.

The action for operating the pedals in this instrument controls the expression perfectly, which is one of the most important features in any instrument, to which attention will now be directed.

In my instrument it does not require a knowledge of music in order to play it properly.

The expression-action is operated as follows: When the music is made, it is provided with perforations where pedal-action is wanted, just the same as where a note is to be sounded. When the perforation intended for expression passes its opening in the air-duct bridge, the bellows are operated similar to that of the striking-bellows described.

In the sustaining or damper pedal the operation is very similar to that of the regular striking action, as the opening of the air-duct bridge allows the bellows S' to be drawn down, pulling down lever T' and holding it the required time. The soft-pedal bellows $S^2$ is operated just the same as sustaining-pedal S', but has the addition of a catch or tripping bar W, lever $T^3$, and small bellows $S^3$. The object of these parts is as follows: As the soft pedal needs to be kept down very often for a considerable length of time, it would require a long continuous slot or hole in the sheet-music to keep the port open to hold the pedal down; but with the catch or trip bar W a small hole in the music passing the opening in the air-duct bridge causes the bellows $S^2$ to draw down the levers $T^2$ until the end catches under top block $b^2$ on catch-bar W, where it is held as long as required. When the time comes to let up the pedal, a perforation in the music operates the small bellows $S^3$, releasing lever $T^3$ and allowing it to return. The first block $b^2$ on tripping-bar W is "soft" on piano and is operated as above described. In case the music requires "very soft" "(P. P.)" or "double piano" the small bellows $S^3$ acts at the same time as the large one, $S^2$, pulling back the catch-bar, allowing the lever $T^2$ to be drawn down until it strikes the stop-block Q. The catch-bar returns instantly and holds the lever down under the lower block $b^3$, where it is held until released by the small bellows $S^3$. In case it is being held at PP, (very soft) and wants to return to P "(medium soft)" the small bellows gives a quick motion, releasing the lever, but returns in time to catch in next space, from which it may be returned again to PP, (very soft,) or released and returned to normal or "loud," there being no limit if the music is properly written. As before mentioned, the small lifting-bellows are of peculiar construction, of which I wish to make particular mention.

Figures 17, 18:
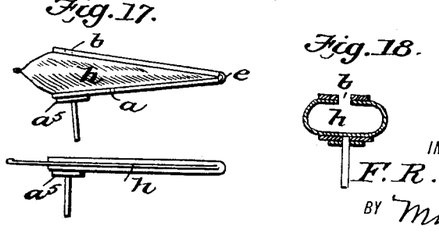
Fig. 17 is a side view in two positions of lifter-bellows with lifting-pin attached, showing vent at $a$ and inlet at $b$.
Fig. 18 is a cross-section of same.

Very fine leather is glued together so as to form a tube the desired length, as shown in Fig. 18, and the ends of this tube are closed by flattening or pressing together and giving them one fold back and gluing them. Then two very light thin pieces of wood are glued on opposite each other, corresponding to the flattened ends of the tube, in order that only one end of this bellows may open. There is a small strip of thin leather glued to the top piece of wood and passed over the end of tube and glued to the bottom. This forms a kind of hinge $e$, allowing only one end to open freely, as shown in Fig. 17. To the top board (bottom, as shown in Fig. 17) at the free end is attached a pin $a^5$ for the purpose of opening the check-valve N, and immediately back of said pin is a small hole or vent. (Shown at $a$, Fig. 17.) The air is admitted to said bellows through an opening in the bottom, as shown at $b$, Fig. 17. This makes a very light and sensitive bellows of more power than any other construction using so small a space.

Having thus described my invention, what I claim as new, and desire to secure by Letters Patent, is—

1. In an automatic piano-playing action, a key-striking device compactly arranged to be placed beneath the keys, and within the piano-case, and comprising a set of vertical lifting-stems, a double series of elbow-levers arranged alternately upon opposite sides of the row of stems, a double series of vertically-arranged striking-bellows operating on said levers, a double series of valves, pneumatics, and chambers, arranged respectively below the two series of striking-bellows and a central supporting-framework and central vertical tubes, connecting the valve-chamber to the striking-bellows substantially as and for the purpose described.

2. In an automatic piano-playing action, the combination of the two rails F F having flange-plates $f f$ and two corresponding series of elbow-levers G pivoted to said plates, vertical key-lifting stems P supported upon the elbow-levers, the vertically-arranged framework B C C B, two series of vertical striking-bellows D D arranged upon opposite sides of the framework to act upon elbow-levers G and subjacent valves, pneumatics, and air-tubes, substantially as and for the purpose described.

3. In an automatic piano-playing action, the combination of a generally vertical framework comprising horizontal top and bottom rails B B and horizontal intermediate rails C C, striking-bellows arranged vertically upon the top rail B and middle rails C, valve mechanism and operating pneumatics arranged vertically upon the middle rails C and lower rail B, connecting-tubes between the valve mechanism and the striking-bellows, said tubes being arranged centrally, a series of vertical lifting-stems for the piano-keys, and means for transmitting the motion of the striking-bellows to the key-lifting stems all being constructed to be placed within the piano-case below the keys and invisible from without substantially as shown and described.

4. In an automatic piano-playing action, the combination with the key-striking bellows and the middle horizontal rails C C and the bottom horizontal rail B; of the vertical valve-boards E having openings through them and provided with bellows-chambers I and valve-cells L on opposite sides of said vertical board, the lifting bellows or pneumatics arranged in chamber I and communicating with tubes leading to the air-duct bridge, the cell L being provided with a check-valve and additional valve $t$, central and vertically-arranged tubes leading to the striking-bellows, said valves, valve-chambers, and bellows being duplicated upon opposite sides of the central pipe and framework substantially as and for the purpose described.

5. The valve mechanism comprising the horizontal frame-rails C B, vertical valve-board E, the bellows-casing H hollowed out and applied to the exterior of valve-board E and having on its outer side tube connection J, the valve-cells L hollowed out and applied to the inside of the valve-board and having a connection N for the striking-bellows tubes and valves and lifting-bellows substantially as shown and described.

6. The air-duct bridge composed of a middle board $a'$ having its upper end slotted, and two side boards $a^2$ and $a^3$ channeled on their sides adjacent to the middle board and terminating short of the upper edge and communicating with the slotted spaces of the middle board, said channels being all arranged to open at their lower ends through one side of the bridge substantially as and for the purpose described.

7. A check-valve M for an automatic piano-player comprising a stiff back piece and a loose flexible facing fastened only at its ends to the back piece and sagging or hanging loosely, a valve-board with a hole in it, and a spring secured to the valve-board and lying against the back of the valve substantially as and for the purpose described.

8. In an automatic piano-playing device the combination with the pedal or expression rods; of an operating-bellows having check-valve and lifting-pneumatic, a connecting-lever, and a supplemental bellows with check-valve and pneumatic, and a catch-lever for the supplemental bellows for catching and holding the lever of the main expression-bellows in either an extreme or intermediate position to continue any expression without undue prolongation of an opening in the paper strip as set forth.

9. In an automatic piano-playing device, the combination with the air-duct bridge, and the two winding-drums on opposite sides of the same; of the longitudinally-adjustable shaft 37 arranged parallel with and in rear of the drums and carrying a rigid collar 38 in the middle, an adjustable friction-gear 35 36 at one end, and an elongated pinion 54 at the other, a train of gears connecting the latter with the winding-drum, a loose pulley 45 with clutch coupling the same to the shaft 37, pulley 48 for the reroll-drum $B^2$, belt 47, shifting slide 39 embracing collar 38, elbow-crank 40 connected to said slide, and adjustable pull-rod for the elbow-crank substantially as and for the purpose described.

10. The combination with the speed-shifting device; of the jointed pull-rod 41, and a pair of electrical contacts controlling an electric motor, said contacts being operated upon by the outer end of the jointed pull-rod with a radial movement of the same handle that operates the speed-shifting devices as shown and described.

11. The combination with the vacuum-chamber for the pneumatics, and the rerolling devices; of the shifting or reversing mechanism, the pull-rod operating the same, the tilting bearing 42 with lug 43, the rocking crank-shaft 44, and the valve $z$ for the vacuum-chamber arranged to be opened simultaneously with the operation of the rerolling devices to relieve the vacuum and prevent playing the music backward when rerolling the same substantially as shown and described.

12. The combination with the vacuum-chamber for the pneumatics; of the relief-valve $z$, crank-shaft 44, the movable bearing 42 hinged at its lower end $h^2$ and having an arm 43 arranged to operate against the crank-shaft, and the pull-rod for disconnecting the gears and rewinding the music-sheet, said pull-rod being arranged to tilt the movable bearing 42, rock the crank-shaft 44, and open the relief-valve substantially as shown and described.

13. The lifter bellows or "pneumatic" comprising a flexible tube $h$ with openings $a$ and $b$, rigid strips on opposite sides of the tube connected together at one end by hinge $e$, and the pin $a^5$ fixed on one of the rigid strips and projecting therefrom substantially as and for the purpose set forth.

FRED R. GOOLMAN.

Witnesses:
G. G. JOHNSON,
M. STEEL.